Feb. 9, 1954    R. R. ANDERSON    2,668,666
APPARATUS FOR COMPARTMENT HEATING
Filed Dec. 5, 1949
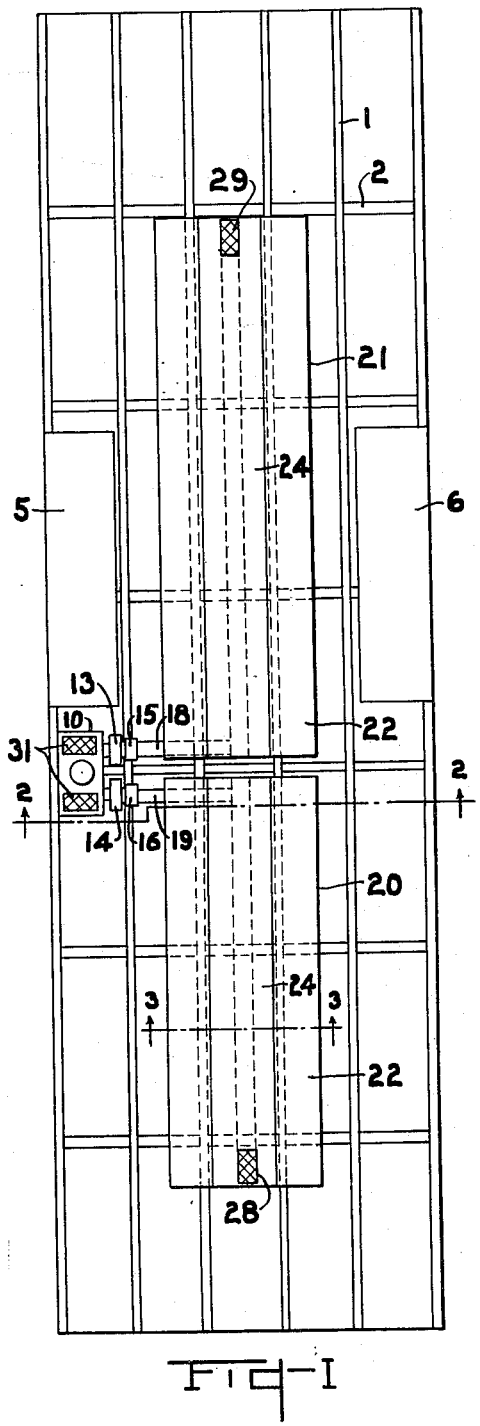
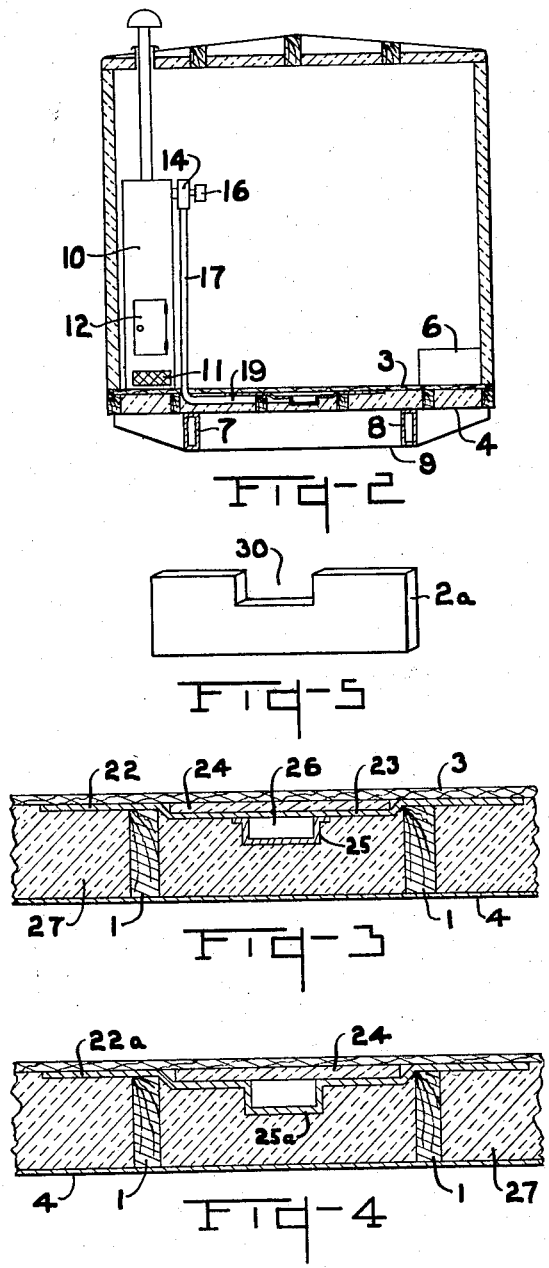
Rex R. Anderson
INVENTOR
BY Roy A. Plant
ATTORNEY Patented Feb. 9, 1954

2,668,666

UNITED STATES PATENT OFFICE 2,668,666

APPARATUS FOR COMPARTMENT HEATING

Rex R. Anderson, Bay City, Mich.

Application December 5, 1949, Serial No. 131,219

2 Claims. (Cl. 237—43)

The present invention relates broadly to compartments having a special heating system, and in its specific phases to house trailers having a floor with spaced apart upper and lower panels, with a heating fluid duct mounted therebetween, said duct having sidewise extending heat conducting members for extended warming of the upper floor panel.

Prior to 1940, practically every house trailer was made with a single floor which was commonly of air-tight or solid construction and insulated. That type of construction was highly satisfactory for warm weather uses but caused extreme discomfort in cold weather, and especially so when outdoor temperatures were below freezing. That discomfort was due to two major causes. The first of these was that in cold weather the floor of the house trailer was exceedingly cold even though the temperature within the trailer near the ceiling was as high as 90° F. The second was that with outdoor temperatures of 15° F. or lower, the inner face of the floor and walls, particularly at the ends of the trailer, was so cold that it would sweat and that sweat would freeze and thaw with the fall and rise of outdoor temperatures. This condition was aggravated in the longer house trailers and especially so when same were partially or fully partitioned into rooms.

As a means of helping to overcome the two noted causes of discomfort, I devised the hollow double floor house trailer heating system wherein the stove was connected direct to the hollow space in the floor, with registers opening into same at each end of the house trailer. A thin layer of insulation, in the form of a fiberboard insulation panel, was placed on the bottom of the house trailer and by circulating air in series through the hollow floor and the stove, the first trailer construction, which was fairly comfortable for use as living quarters in cold weather, was evolved as set forth in my Patent No. 2,225,244. However, the heat losses through the bottom panel of the floor were excessive and it was difficult to force warm air through the full length of the hollow floor and have same come out of the registers feeling warm. This hollow air space, moreover, served to catch lint and dust which was highly inflammable and caused an ever present danger of fire as well as dust explosion. To overcome this fire and dust explosion hazard, I devised a metal duct system with the ducts placed in the open space of the hollow floor as shown in my Patent No. 2,417,463. That system depended upon radiation of heat into the hollow open space in the floor to produce a warmed area, which was limited to the space between the pair of longitudinal floor frame members between which the hot air duct passed, as well as circulation of heated air through the duct to the ends of the trailer. Loss of heat by radiation through the bottom panel of the floor was still excessive, and the floor and linoleum directly above the duct was frequently so hot that it was somewhat uncomfortable for continuous standing, and the life of the linoleum was undesirably shortened. It was a recognition of room heating problems, as well as the difficulties and shortcomings of the prior house trailer heating systems, which lead to the conception and development of the present invention.

Accordingly, among the object of the present invention is the provision of a metal duct type of heating system installed in the hollow space between two floor panels and adjacent the upper one, with the space beside and under the ductwork being filled with insulation so as to completely eliminate open air spaces and minimize downward radiation loss of heat.

Another object is to provide a heat insulation panel between the top of the hot air carrying portion of the duct assembly and the upper floor panel directly adjacent thereto to protect same from being excessively heated.

Another object is to utilize a wide sheet metal panel to form sidewise extensions from a hot air duct mounted directly below the upper panel of the floor, said extending metal panel carrying heat by conduction from said hot air duct to slightly warm the upper floor panel which is directly adjacent and preferably in contact with a portion of said panel remote from said duct.

Another object is to construct the double floor assembly in relatively air-tight sections for rigidly supporting the floor and facilitating the controlling of the moderate heating of a substantial portion of the upper panel of same.

Another object is to provide a hollow floor for a compartment wherein there is a heating duct system in said hollow floor with a heat insulating panel above the fluid carrying portion of said duct system, and a relatively thick body of insulation under said duct system so that heat loss through the bottom panel is minimized, the upper panel is not overheated, heated air may be forced rapidly through the duct, and such air will emerge therefrom at a satisfactorily warm temperature.

A further object is to provide a duct type heating system installed in the double floor of a compartment to be heated, and wherein the open air space in said double floor is eliminated and at the same time two duct systems are utilized with one running to one end of the compartment, and the other to the other end of the compartment, with each duct system having its own individual air circulating fan assembly.

A further object is to provide a panel heating system for house trailers and the like wherein said system is simple, of moderate cost, easy to install, efficient, and safe.

Still further objects and advantages of the present invention will appear as the description proceeds.

To the accomplishment of the foregoing and related ends, the invention, then, consists of the heating means hereinafter fully described and particularly pointed out in the claims, the annexed drawing and the following description setting forth in detail certain means of carrying out the invention, such disclosed means illustrating, however, but several of the various ways in which the principle of the invention may be used.

In the annexed drawing—

Figure 1 shows a top view of the floor portion of a house trailer with the stove in place, and the upper panel of the floor removed to show some of the details of the inner construction of same.

Figure 2 shows in diagrammatic manner a vertical section of a house trailer equipped only with a stove and duct system, all as taken at line 2—2 of Figure 1 looking in the direction of the arrows.

Figure 3 shows an enlarged fragmentary section through the house trailer floor taken at line 3—3 of Figure 1, looking in the direction of the arrows, and illustrating one form of the improved floor heating duct system.

Figure 4 shows a sectional view of a modified form of the heating duct system illustrated in Figure 3.

Figure 5 shows a perspective view of a preferred form of one of the cross members which extends crosswise of and under the heating duct.

Referring more particularly to Figures 1 and 2 of the drawing, it will be noted that the floor portion of the house trailer utilizes longitudinal framing members 1 and cross framing members 2, all preferably of wood, which form multiple relatively airtight sections in the floor between its upper panel 3 and lower panel 4 which are preferably of tight construction. This upper panel is preferably made of plywood, the upper surface of which is commonly covered with linoleum, while the lower panel is preferably made out of sheet metal so as to be fire proof as well as water and airtight. Conventional wheel wells 5 and 6 are used to provide clearance for the upper portion of the wheels (not shown) on which the whole assembly is transportably mounted, but which does not form part of the present invention. The double floor is normally mounted on a pair of tubular steel frame members 7 and 8, and these frame members in turn are provided with cross members 9, which are preferably of steel and welded to them. This gives a very strong foundation for the whole assembly and one which is readily adapted for mounting on a suitable wheeled chassis (not shown).

Various types of stoves 10 can be used in connection with the present heating system and a preferred form of same is of elongated construction extending above mid-ceiling height of the compartment. This allows the use of a longer fire pot (not shown) in the stove, which facilitates more efficient heat radiation, and where room air is to be mixed with the heated air in the top of the stove for delivery into the ductwork, this permits the warm air in the upper portion of the compartment to be drawn in through grills 31 and mixed with the stove heated air for more efficient compartment heating. This stove will have conventional inlets 11 at its bottom for air to be heated, and it will also be provided with a conventional door 12 for access into the fire pot. At the top of the stove, and connected to the heated air space thereof, are fans 13 and 14 driven by the electric motors 15 and 16. The outlet from each of the fans 13 and 14 is connected by means of individual pipes 17 to their corresponding cross ducts 18 and 19.

Mounted in the floor, and directly under top panel 3 thereof, are the forward and rear ductwork assemblies 20 and 21. Each of these assemblies, in preferred construction, utilizes a metal heat conducting plate 22, Figure 3, which is provided with a longitudinally recessed portion 23. A heat insulating panel 24 made from a material such as asbestos, is mounted in this longitudinally recessed space to reduce heat flow directly up through the floor from the hottest portion of the assembly and yet permit heat to be conducted sidewise through plate 22 to safely warm a larger portion of the floor, and which normally would be a major portion of the exposed upper surface of same. A convenient width for panel 22, when used in a house trailer, is from 30" to 36" which thus makes possible warming a space wider than between a pair of the longitudinal floor frame members 1. Mounted substantially centrally of heat conducting panel 22, and on the under face of same, is a substantially U-shape member 25, Figure 3, with the inner portion of same forming with said heat conducting plate 22 an open passageway 26 adapted to have a heated fluid such as air forced therethrough. The space between upper and lower floor panels 3 and 4, and below the duct assembly, is completely filled with an insulating material 27, preferably of the porous and fire proof type made from fused rock or glass, such as is now commonly called rock wool, fiber glass, expanded mica, or the like. The space between top and bottom panels 3 and 4 is preferably about 2⅜" and with a 1" depth duct 26, there is over a 1" thickness of heat insulation 27 between that duct and bottom panel 4. This type of construction thus uses the heat insulating panel 24 to protect the upper panel 3 of the floor from being overheated, while insulating material 27 efficiently minimizes heat losses through bottom panel 4 far in excess of any heated floor construction for house trailers heretofore devised.

A modified construction of the duct assembly is shown in Figure 4 where the heat conducting plate 22a has a downwardly bent portion 25a at its center which takes the place of U-shape member 25 shown in Figure 3. The upper face of this U-shape portion is then closed by means of heat insulating panel 24 to form a cheaper and more easily fabricated duct-work assembly.

As shown in Figure 1, the front duct-work assembly 20 is connected to cross duct 19 for receipt of heated air therethrough under operation of fan 14. At the forward end of this duct-work assembly 20, is provided an outlet register 28. The rear duct-work assembly 21 is connected at its inlet end to cross duct 18 through which heated air is delivered from stove 10 by means of fan 13. At the outlet end of duct-work assembly 21 is provided an outlet register 29 for delivering heated air into the rear portion of the trailer compartment. It is intended that the showing of registers 28 and 29 is to be considered as diagrammatically illustrating the use of one or more registers, as desired, in each duct-work assembly.

By using separate longitudinal duct-work assemblies and separate fans connected to the heating space of the stove, it is possible to deliver heat to either end of the trailer compartment or to both at the same time if so desired. This becomes important if it is desired, for instance, to heat the forward or living portion of the trailer while allowing the rear or sleeping portion to be cooler, all of which can be readily accomplished by shutting off or slowing down the fan delivering heated air to the sleeping portion of the trailer.

By utilizing duct-work assemblies as described herein, a relatively large area of the floor, usually a major portion of the exposed upper face of same, will be warmed so as to be comfortable without being excessively hot, and at the same time completely filling the hollow space of the floor with insulation will make possible the delivery of truly warm air out of the registers, a thing which produces the most comfortable and efficient house trailer heating construction for cold weather use which has been devised up to the present time.

In order to support the duct-work assembly between the center pair of longitudinal framing members 1, there is provided at suitably spaced intervals special cross framing members 2a, Figure 5, which are provided with a notch 30 into which the U-shape member 25 can extend and be supported so as to prevent the assembly from sagging away from upper floor panel 3.

While the invention has been illustrated and described as a floor heating method and apparatus, it is not limited to such use since in compartment heating this same construction can be mounted in the sidewalls or ceiling of the compartment for heating same, and wherein panel 3 would be the inner face of the compartment wall or ceiling.

Other modes of applying the principle of my invention may be employed instead of those explained, change being made as regards the means herein disclosed, provided those stated by any of the following claims or their equivalent be employed.

I therefore particularly point out and distinctly claim as my invention:

1. In a house trailer or the like which has insulated side and end walls, an insulated roof, an externally exposed double floor, the top and bottom portions of which are of tight construction and substantially uniform thickness throughout with a relatively shallow air space therebetween, and a heating stove, separate duct-work assemblies in the upper portion of the space between said top and bottom panels of the floor, one of said duct-work assemblies starting approximately opposite the stove and extending forwardly of the house trailer while the other duct-work assembly also starts approximately opposite the stove and extends rearwardly of the house trailer, each of said duct-work assemblies having a heating fluid passageway of substantially U-shape extending lengthwise of and substantially centrally thereof, and also having a heat conducting metal panel means connected to and forming a closure for the upper side of the passageway and extending sidewise from the top thereof substantially parallel to said top floor panel, adjacent thereto, and in contact with the under face of said floor panel in the outer portions of said heat conducting panel, separate electric fan apparatus and ducts connecting the upper portion of said stove to said duct-work assemblies so that air heated by said stove can be forced through either duct-work assembly or both at the same time, each of said duct-work assemblies having at least one outlet register opening into the interior of said house trailer with such register being at the end of said assembly remote from the inlet thereto, both of said duct-work assemblies having a depressed upper portion with a heat insulating panel therein, said panel being between the heating fluid passageway of said duct-work and the upper panel of said floor with said insulating panel preferably being a little wider than said heating fluid passageway and adapted to retard heat flow direct from said passageway up through said upper panel of the floor, the heat insulation material filling the open space between said top and bottom panels of said double floor outside of and below said heating fluid passageway, whereby heat from the heating fluid passing through said passageway is radiated up through the top panel of said floor not only from the upper face of said passageway but also from the upper face of said heat conducting metal panels which extend sidewise therefrom.

2. In a house trailer or the like which has insulated side and end walls, an insulated roof, an externally exposed double floor, the top and bottom portions of which are of tight construction and substantially uniform thickness throughout with a relatively shallow air space therebetween, and a heating stove, separate duct-work assemblies in the upper portion of the space between said top and bottom panels of the floor, one of said duct-work assemblies starting approximately opposite the stove and extending forwardly of the house trailer while the other duct-work assembly also starts approximately opposite the stove and extends rearwardly of the house trailer, each of said duct-work assemblies comprising a heat conducting metal panel means extending lengthwise of and substantially centrally thereof and having a substantially U-shaped centrally depressed longitudinally extending portion forming a heating fluid passageway, an insulating panel forming a closure for the open upper side of the heating fluid passageway with said insulating panel being a little wider than said passageway and adapted to retard heat flow direct from said passageway up through said upper panel of said floor, side extensions on said metal panel means laterally of said insulating panel being in contact with the under face of said top panel of the floor outwardly of said insulating panel, separate electric fan apparatus and ducts connecting the upper portion of said stove to said duct-work assemblies so that air heated by said stove can be forced through either duct-work assembly or both at the same time, each of said duct-work assemblies having at least one outlet register opening into the interior of said house trailer with such register being at the end of said assembly remote from the inlet thereto, both of said duct-work assemblies having a depressed upper portion with the heat insulating panel therein, said panel being between the heating fluid passageway of said duct-work and the upper panel of said floor with said insulating panel preferably being a little wider than said heating fluid passageway and adapted to retard heat flow direct from said passageway up through said upper panel of the floor, the heat insulation material filling the open space between said top and bottom panels of said double floor outside of and below said heating fluid passageway, whereby heat from the heating fluid passing through said passageway is radiated up through the top panel of said floor not only from the upper face of said passageway but also from the upper face of said heat conducting metal panels which extend sidewise therefrom.

REX R. ANDERSON.

References Cited in the file of this patent

UNITED STATES PATENTS

| Number | Name | Date |
|---|---|---|
| 2,191,526 | Flogaus | Feb. 27, 1940 |
| 2,326,318 | Anderson | Aug. 10, 1943 |
| 2,417,463 | Anderson | Mar. 18, 1947 |

FOREIGN PATENTS

| Number | Country | Date |
|---|---|---|
| 278,195 | Great Britain | Oct. 6, 1927 |
| 461,421 | Great Britain | Feb. 16, 1937 |